Nov. 16, 1926.
J. C. SWINBURNE
1,607,022
MILKING PAD
Filed June 14, 1926
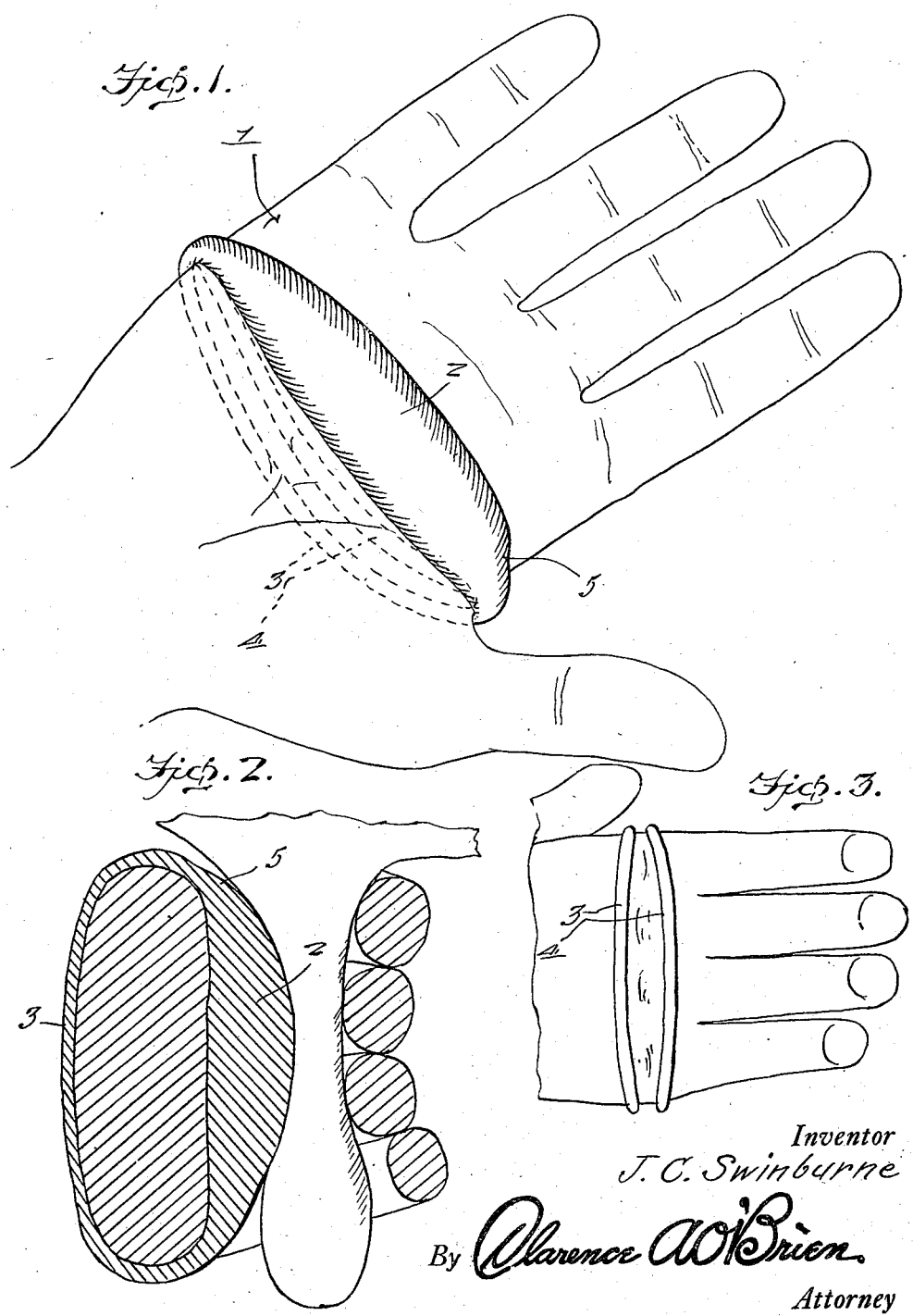
Inventor
J. C. Swinburne
By Clarence A. O'Brien
Attorney Patented Nov. 16, 1926.

1,607,022

UNITED STATES PATENT OFFICE.

JOHN C. SWINBURNE, OF FOREST GROVE, OREGON.

MILKING PAD.

Application filed June 14, 1926. Serial No. 115,905.

The present invention relates to a highly novel and simple device for facilitating the rapid and easy milking of cows.

Heretofore the hands of a person milking a cow became cramped and as a result, the cows cannot be milked by hand very efficiently. It is an object of the present invention to provide a pad which may be readily and easily attached so as to be disposed across the palm of the hand and when properly worn, the pad will not cause any discomfort to the milker and will enable the milker to milk more rapidly and easily.

A further object of the invention is to provide a milking pad of the above mentioned character wherein the same is of such construction as to provide a means for preventing the milk flowing back from the teat to the udder.

A further object of the invention is to provide a milking pad of the above mentioned character which can be easily worn on the hand of a milker, the same being further simple in construction, inexpensive, strong, and durable and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the several views:

Figure 1 is a perspective view of the milking pad embodying my invention showing the manner in which the same extends across the palm of the hand.

Figure 2 is a vertical sectional view showing the pad in use, and

Figure 3 is a plan view showing the strap portions of the pad extending across the back of the hand.

In the drawing wherein for the purpose of illustration is shown the preferred embodiment of my invention, the numeral 1 designates generally my improved milking pad, the same being preferably formed of soft rubber. The pad includes a roll like portion 2 which is adapted to extend transversely across the palm of the hand of the milker, the roll portion 2 gradually decreasing in size from its center to its end. The ends of the roll merge into a pair of strap members 3 and 4 respectively which extend across the back of the hand in the manner as clearly shown in Figures 1 and 3.

By arranging the strap portions 3 and 4 in the manner shown and above described, the strap may be adjusted on the back of the hand and as is shown in Figure 3, the knuckles of the hand are disposed between the spaced straps.

The portion of the roll 2 which is disposed adjacent the thumb and index finger of the hand is blunt or slightly enlarged as illustrated at 5, and the purpose of this construction will be hereinafter more fully described.

In use, the pad is placed on the hand of the milker in the manner shown in Figure 1 and the teat will be squeezed or compressed between the roll 2 of the pad 1 and the fingers of the hand in the manner as clearly shown in Figure 2. The blunt or enlarged end portion 5 of the roll 2 will be disposed adjacent the udder so that the milk will be prevented from flowing back after the milk has once started to flow.

The provision of a milking pad of the above mentioned character will prevent the cramping of the hand while milking and will furthermore expedite the milking operation. The use of a milking pad of the above mentioned character will not necessitate the exertion of any considerable amount of pressure in causing the milk to flow through the teats.

The simplicity of my milking pad enables the same to be manufactured at a very low cost and by constructing the same of rubber to provide a unitary structure, the article may be easily and efficiently cleaned, thus promoting sanitation.

While I have shown the preferred embodiment of my invention it is to be understood that minor changes in the size, shape, and arrangement of parts may be resorted to without departing from the spirit of the invention and the scope of the appended claims.

Having thus described the invention, what I claim as new and desire to secure by Letters Patent is:—

1. A hand milking pad comprising a teat engaging roll portion extending transversely across the palm of the hand.

2. A hand milking pad comprising a teat engaging roll portion extending transversely across the palm of the hand, and a strap associated with said pad adapted to extend across the back of the hand.

3. A hand milking pad comprising a teat engaging roll portion which extends across the palm of the hand, the ends of the roll portion merging into a pair of straps which are adapted to extend across the back of the hand.

4. A hand milking pad comprising a teat engaging roll portion which extends across the palm of the hand, the ends of the roll portion merging into a pair of straps which are adapted to extend across the back of the hand, one end portion of said roll being larger than the other end portion.

5. A hand milking pad comprising a teat engaging roll portion, said roll portion gradually decreasing in size toward its ends, the ends of said roll portion merging into a pair of spaced strap members which extend across the back of the hand, one end portion of the roll being relatively larger than the other end.

In testimony whereof I affix my signature.

JOHN C. SWINBURNE.